(12) United States Patent
Sakaguchi et al.

(10) Patent No.: US 11,797,592 B2
(45) Date of Patent: Oct. 24, 2023

(54) DOCUMENT CLASSIFICATION METHOD, DOCUMENT CLASSIFIER, AND RECORDING MEDIUM

(71) Applicant: Panasonic Intellectual Property Management Co., Ltd., Osaka (JP)

(72) Inventors: Akihiro Sakaguchi, Osaka (JP); Tsuyoshi Ogomori, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 399 days.

(21) Appl. No.: 17/331,690

(22) Filed: May 27, 2021

(65) Prior Publication Data
US 2021/0390297 A1 Dec. 16, 2021

(30) Foreign Application Priority Data
Jun. 12, 2020 (JP) ................................ 2020-102007

(51) Int. Cl.
*G06F 16/35* (2019.01)
*G06F 40/30* (2020.01)
(Continued)

(52) U.S. Cl.
CPC ............ *G06F 16/35* (2019.01); *G06F 18/22* (2023.01); *G06F 40/279* (2020.01); *G06F 40/30* (2020.01); *G06V 30/413* (2022.01); *G06V 30/414* (2022.01)

(58) Field of Classification Search
CPC ........ G06F 16/35; G06F 18/22; G06F 40/279; G06F 40/30; G06F 40/268; G06F 40/284;
(Continued)

(56) References Cited

U.S. PATENT DOCUMENTS
2015/0161144 A1 6/2015 Goto et al.

FOREIGN PATENT DOCUMENTS
| JP | 11-167581 | 6/1999 |
| JP | 2006-293767 | 10/2006 |
| JP | 2014-041481 | 3/2014 |

*Primary Examiner* — Nimesh Patel
(74) *Attorney, Agent, or Firm* — Wenderoth, Lind & Ponack, L.L.P.

(57) ABSTRACT

A document classification method includes extracting one or more first feature words from first sentence information included in a first document to be classified, extracting, from a database including a plurality of cases, a predetermined number of first cases similar to the first document in accordance with the one or more first feature words extracted from the first sentence information, the plurality of cases including the predetermined number of first cases and being classified in advance into the at least one category, the plurality of cases each including second sentence information indicating a main point of each of one or more items, the one or more items being classified in advance depending on meaning of the item, extracting one or more second feature words of each of the predetermined number of first cases from the second sentence information of each of the predetermined number of first cases, calculating a degree of coincidence between each of the predetermined number of first cases and the first document based on the one or more second feature words extracted from the second sentence information of the first case, and classifying the first document into a category among the at least one category, the category being a category into which a first case having a highest degree of coincidence among the predetermined number of the first cases is classified.

10 Claims, 12 Drawing Sheets

(51) Int. Cl.
  *G06F 40/279* (2020.01)
  *G06V 30/414* (2022.01)
  *G06V 30/413* (2022.01)
  *G06F 18/22* (2023.01)

(58) Field of Classification Search
  CPC ...... G06F 18/241; G06F 16/313; G06F 16/93; G06F 40/129; G06F 16/3329; G06F 40/194; G06F 16/248; G06F 40/289; G06F 16/3344; G06F 16/345; G06F 18/2137; G06F 16/217; G06F 16/243; G06F 16/24578; G06F 16/3334; G06F 16/334; G06F 16/735; G06F 16/9538; G06F 40/20; G06F 40/237; G06F 40/40; G06F 40/42; G06F 40/44; G06F 40/55; G06F 40/56; G06F 40/211; G06F 16/3338; G06F 16/90344; G06F 16/90332; G06F 16/10; G06F 40/106; G06F 40/103; G06F 40/10; G06F 40/157; G06F 40/242; G06F 40/263; G06F 40/258; G06F 16/338; G06F 16/50; G06F 16/9038; G06F 18/00; G06F 18/24; G06F 16/20; G06F 16/5846; G06F 18/254; G06F 40/151; G06F 40/58; G06F 16/2237; G06F 16/3347; G06F 9/453; G06F 18/23; G06F 16/3331; G06F 16/434; G06F 16/55; G06F 40/216; G06F 40/274; G06V 30/413; G06V 30/414; G06V 30/10; G06V 10/82; G06V 30/1478; G06V 30/18; G06V 30/19013; G06V 30/40; G06V 30/416; G06V 30/418; G06V 30/268; G06V 20/70; G06V 30/12; G06V 30/2272; G06V 30/287; G06V 30/1448; G06V 20/40; G06V 20/41; G06V 30/1426; G06V 30/18067; Y10S 707/99933; Y10S 707/917; Y10S 707/99934; Y10S 707/99932; Y10S 707/99935; Y10S 707/99943; Y10S 707/99936; Y10S 707/99945; Y10S 707/99931; Y10S 707/99937; Y10S 707/99944; G06N 3/004; G06N 20/00; G06N 3/045; G06N 3/088; G06N 5/022; G06N 3/04; G06N 3/044; G06N 5/02; G06N 3/08; G06N 5/025; G06N 3/084; G06N 20/20; G06N 5/01; G10L 15/063; G10L 15/16; G10L 15/197; G10L 15/26; G10L 13/08; G10L 15/02; G10L 2021/0135; G10L 2015/027; G10L 15/183
  See application file for complete search history.

FIG. 2

| Category A | Item classification case a | Item 1 Target | Item 2 Failure mode | Item 3 Impact | Item 4 Cause | Item 5 Countermeasure | URL |
|---|---|---|---|---|---|---|---|
| | Item classification case b | Target | Failure mode | Impact | Cause | Countermeasure | URL |
| | Item classification case c | Target | Failure mode | Impact | Cause | Countermeasure | URL |
| | ⋮ | | | | | | |
| | Item classification case x | Target | Failure mode | Impact | Cause | Countermeasure | URL |

| Category B | Item classification case a | Item 1 Target | Item 2 Failure mode | Item 3 Impact | Item 4 Cause | Item 5 Countermeasure | URL |
|---|---|---|---|---|---|---|---|
| | Item classification case b | Target | Failure mode | Impact | Cause | Countermeasure | URL |
| | Item classification case c | Target | Failure mode | Impact | Cause | Countermeasure | URL |
| | ⋮ | | | | | | |
| | Item classification case x | Target | Failure mode | Impact | Cause | Countermeasure | URL |

⋮

| Category K | Item classification case a | Item 1 Target | Item 2 Failure mode | Item 3 Impact | Item 4 Cause | Item 5 Countermeasure | URL |
|---|---|---|---|---|---|---|---|
| ⋮ | | | | | | | |

FIG. 5

| | | Item 1 | Item 2 | Item 3 | Item 4 | Item 5 |
|---|---|---|---|---|---|---|
| Category A | First case NO.502 | Target | Failure mode | Impact | Cause | Counter-measure |
| | | | | | | |
| | | | | | | |
| | First case NO.503 | Target | Failure mode | Impact | Cause | Counter-measure |
| | | | | | | |
| | | | | | | |
| Category D | First case NO.10521 | Target | Failure mode | Impact | Cause | Counter-measure |
| | | | | | | |
| | | | | | | |
| | First case NO.10525 | Target | Failure mode | Impact | Cause | Counter-measure |
| | | | | | | |
| | | | | | | |
| Category E | First case NO.15231 | Target | Failure mode | Impact | Cause | Counter-measure |
| | | | | | | |
| | | | | | | |

FIG. 6

| | | Item 1 | Item 2 | Item 3 | Item 4 | Item 5 |
|---|---|---|---|---|---|---|
| Category A | First case NO.502 | Target | Failure mode | Impact | Cause | Counter-measure |
| | | A | A | B | A | C |
| | First case NO.503 | Target | Failure mode | Impact | Cause | Counter-measure |
| | | A | A | B | A | A |
| Category D | First case NO.10521 | Target | Failure mode | Impact | Cause | Counter-measure |
| | | B | C | C | — | A |
| | First case NO.10525 | Target | Failure mode | Impact | Cause | Counter-measure |
| | | B | C | C | — | C |
| Category E | First case NO.15231 | Target | Failure mode | Impact | Cause | Counter-measure |
| | | — | — | C | — | C |

FIG. 11

| Design target | Pheno-menon | Mechanism | Cause | Countermeasure |
|---|---|---|---|---|
| Hard disk | HDD malfunction | If controller LSI is used for long time under high temperature and high humidity conditions, controller LSI will be defective | Caused by sumitomo bakelite's package sealant containing red phosphorus | Do not use sealant containing phosphorus in package |

# DOCUMENT CLASSIFICATION METHOD, DOCUMENT CLASSIFIER, AND RECORDING MEDIUM

BACKGROUND

1. Technical Field

The present disclosure relates to a document classification method, a document classifier, and a recording medium.

2. Description of the Related Art

For example, Japanese Patent Unexamined Publication No. 2014-41481 discloses a document classifier for classifying a large amount of digitized documents into categories according to the content thereof. In the technique disclosed in Japanese Patent Unexamined Publication No. 2014-41481, based on the reliability score obtained by repeating a dependency analysis by analyzing the frequency of occurrence and co-occurrence relationship of words included in the sentences in a document to be classified into a category, the phrases that feature the sentences are narrowed down and extracted. The category of the sentences is classified by generating a category of the sentences by using the phrases that are the features of the sentences.

SUMMARY

A document classification method according to one embodiment of the present disclosure is a method that is executed by a computer classifying documents into at least one category, the method including: extracting one or more first feature words from first sentence information included in a first document to be classified, extracting, from a database including a plurality of cases, a predetermined number of first cases similar to the first document in accordance with the one or more first feature words extracted from the first sentence information, the plurality of cases including the predetermined number of first cases and being classified in advance into the at least one category, the plurality of cases each including second sentence information indicating a main point of each of one or more items, the one or more items being classified in advance depending on meaning of the item, extracting one or more second feature words of each of the predetermined number of first cases from the second sentence information of each of the predetermined number of first cases, calculating a degree of coincidence between each of the predetermined number of first cases and the first document based on the one or more second feature words extracted from the second sentence information of the first case, and classifying the first document into a category among the at least one category, the category being a category into which a first case having a highest degree of coincidence among the predetermined number of the first cases is classified.

A document classifier according to one embodiment of the present disclosure is a document classifier that classifies a document into at least one category, the document classifier including: a processor, and a memory, in which the processor is configured to use a program recorded in the memory to extract one or more first feature words from first sentence information included in a first document to be classified, to extract, from a database including a plurality of cases, a predetermined number of first cases similar to the first document in accordance with the one or more first feature words extracted from the first sentence information, the plurality of cases including the predetermined number of first cases and being classified in advance into the at least one category, the plurality of cases each including second sentence information indicating a main point of each of one or more items, the one or more items being classified in advance depending on meaning of the item, to extract one or more second feature words of each of the predetermined number of first cases from the second sentence information of each of the predetermined number of first cases, to calculate a degree of coincidence between each of the predetermined number of first cases and the first document based on the one or more second feature words extracted from the second sentence information of the first case, and to classify the first document into a category among the at least one category, the category being a category into which a first case having a highest degree of coincidence among the predetermined number of the first cases is classified.

A recording medium according to one embodiment of the present disclosure is a computer-readable non-temporary recording medium having recorded therein a program for causing a computer to execute a document classification method of classifying documents into at least one category, the computer executes: extracting one or more first feature words from first sentence information included in a first document to be classified, extracting, from a database including a plurality of cases, a predetermined number of first cases similar to the first document in accordance with the one or more first feature words extracted from the first sentence information, the plurality of cases including the predetermined number of first cases and being classified in advance into the at least one category, the plurality of cases each including second sentence information indicating a main point of each of one or more items, the one or more items being classified in advance depending on meaning of the item, extracting one or more second feature words of each of the predetermined number of first cases from the second sentence information of each of the predetermined number of first cases, calculating a degree of coincidence between each of the predetermined number of first cases and the first document based on the one or more second feature words extracted from the second sentence information of the first case, and classifying the first document into a category among the at least one category, the category being a category into which a first case having a highest degree of coincidence among the predetermined number of the first cases is classified.

These general or specific aspects may be realized in a recording medium such as a device, a method, a system, an integrated circuit, a computer program or a computer-readable CD-ROM, or may be realized by any combination of a device, a method, a system, an integrated circuit, a computer program, and a recording medium.

BRIEF DESCRIPTION OF THE DRAWINGS

FIG. 2 is a diagram illustrating an example of a case included in a database according to Embodiment 1;

FIG. 5 is a diagram illustrating an example of first cases extracted by the first case extractor according to Embodiment 1;

FIG. 6 is a diagram illustrating examples of degrees of coincidence between the items of each of five first cases extracted in FIG. 5 and a first document;

FIG. 11 is a diagram illustrating an example of the main points of the content of each item in the first document, which are created by a main point creator according to Embodiment 2.

DETAILED DESCRIPTION (Background of Present Disclosure)

Figure 1:
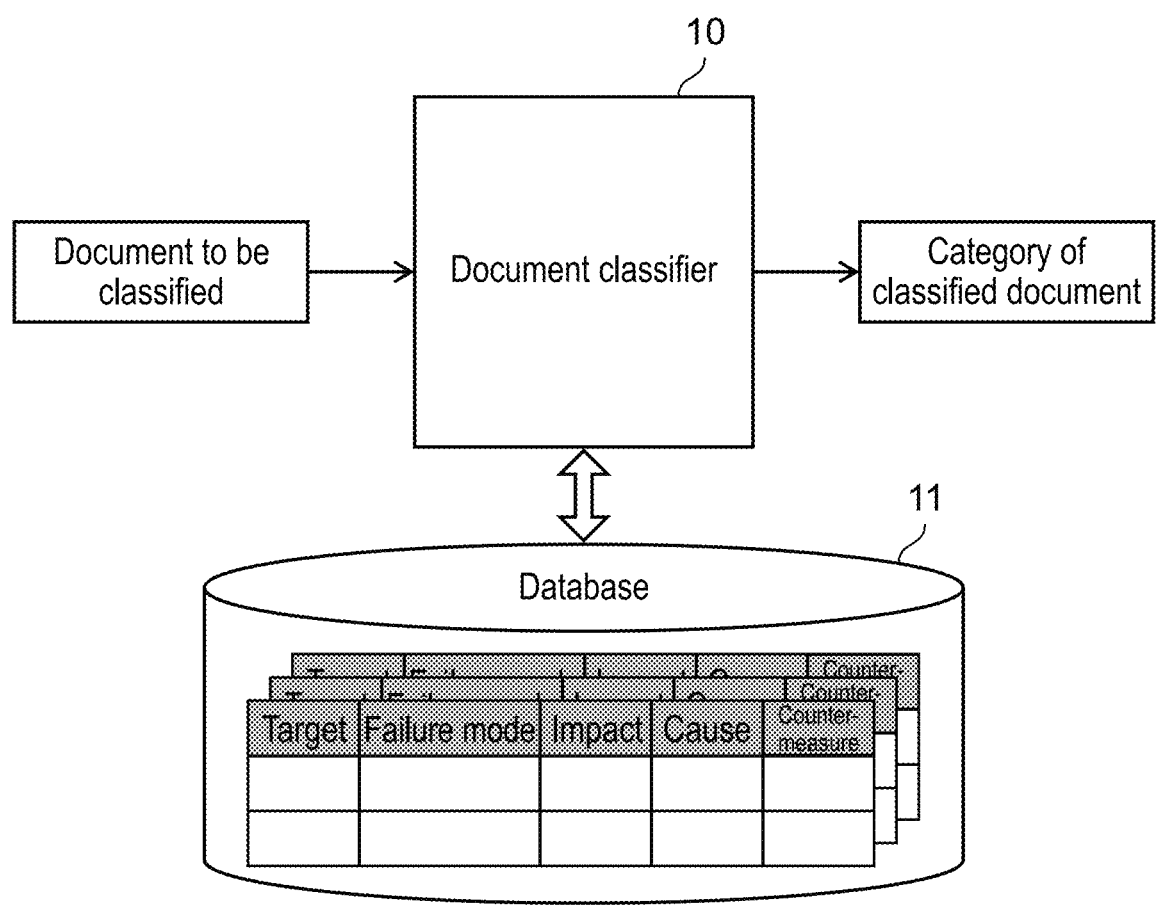
FIG. 1 is a block diagram illustrating an example of a document classifier according to Embodiment 1.

In recent years, a large amount of digitized documents such as academic literature such as technical reports or papers have been accumulated.

Therefore, it is expected that such documents are automatically classified into categories according to the content thereof by using artificial intelligence (AI) or the like.

When a large amount of digitized documents are classified into categories, it is easier to search for those documents. As a result, it may be possible to grasp the cause of a defect and resolve the defect, which was possible by relying on the knowledge of a veteran in the past, in a shorter time by using a searched document, without relying on the knowledge of the veteran. Further, if it is possible to analyze the content of academic literature by using big data analysis of the academic literature or machine learning, it may be possible to grasp the cause of a defect and resolve the defect in a shorter time, thereby suppressing the enormous recall cost associated with the defect. Therefore, it can be said that the impact on society of automatically classifying the category of digitized documents is great.

On the other hand, as described above, Japanese Patent Unexamined Publication No. 2014-41481 discloses a document classifier for classifying a large amount of digitized documents into categories according to the content thereof.

However, in the technique disclosed in Japanese Patent Unexamined Publication No. 2014-41481, there is a problem that the categories cannot be classified accurately unless the phrases that feature sentences can be extracted accurately. In order to accurately extract the phrases that feature sentences, it is necessary to repeat advanced natural language processing such as analyzing the frequency of occurrence and co-occurrence relationship and performing a dependency analysis to obtain a reliability score equal to or higher than a threshold value. That is, the Japanese Patent Unexamined Publication No. 2014-41481 requires complicated and advanced natural language processing when narrowing down and extracting phrases that feature the sentences included in a document. Since the workload is high (in other words, the amount of calculation is large) when a computer performs such advanced natural language processing and the processing power is required, it may be difficult to extract phrases accurately.

Therefore, it is expected that the amount of calculation of the computer can be reduced and the categories can be classified accurately even if phrases that feature the sentences cannot be extracted accurately.

The present disclosure has been made in view of the above circumstances, and an object of the present disclosure is to provide a document classification method or the like capable of accurately classifying the category of a document.

A document classification method according to one embodiment of the present disclosure is a method that is executed by a computer classifying a document into at least one category, the method including: extracting one or more first feature words from first sentence information included in a first document to be classified, extracting a predetermined number of first cases similar to the first document based on the extracted one or more first feature words from a database that includes a plurality of cases in which second sentence information indicating a main point of an item classified in advance by meaning is previously included for each of one or more items and one or more categories classified in advance are assigned, extracting one or more second feature words of each of the predetermined number of first cases from the second sentence information of each of the predetermined number of first cases, calculating a degree of coincidence between each of the predetermined number of first cases and the first document based on the extracted one or more second feature words, and classifying the first document into at least one category by determining one or more categories assigned to the first case having the highest degree of coincidence among the calculated degrees of coincidence as the category of the first document.

With this configuration, it is possible to classify a document into a category accurately.

More specifically, with this configuration, even if one or more first feature words cannot be accurately extracted from the first sentence information included in the first document to be classified, by using the first feature words, a predetermined number of first cases similar to the first document are extracted from a database in which cases already classified with high accuracy are accumulated. The degree of coincidence with the first document to be classified is calculated by using one or more second feature words extracted from each of the extracted predetermined number of first cases, and the category of the first case which is most similar to the first document is determined as the category of the first document. That is, by using the database in which the cases already classified with high accuracy are accumulated, the category of the first document is classified by using the category of the first case which is most similar to the first document. As a result, it is possible to classify the category of the first document accurately even if the first feature words cannot be extracted accurately.

Further, for example, when extracting the one or more first feature words, a plurality of words included in the first sentence information may be extracted with morphological analysis of the first sentence information, a score may be calculated from the frequency of occurrence and co-occurrence relationship of the plurality of words obtained by performing a dependency analysis of the plurality of words, and the one or more first feature words may be extracted from the first sentence information by determining one or more words having the calculated score equal to or higher than a threshold value as the one or more first feature words.

Here, for example, when extracting the predetermined number of first cases, a degree of similarity between a word included in the second sentence information and the one or more first feature words may be calculated by comparing the second sentence information of each of the plurality of cases included in the database with the extracted one or more first feature words, and the predetermined number of first cases may be extracted in descending order of the degree of similarity from the first case having a highest degree of similarity.

Further, for example, when extracting the one or more second feature words, second feature words for each of the one or more items in each of the predetermined number of first cases may be extracted as the one or more second feature words from the second sentence information included for each of the one or more items in each of the predetermined number of first cases.

Further, for example, when calculating the degree of coincidence, the second feature words for each of the one or more items in each of the predetermined number of first cases may be compared with the first sentence information included in the first document, and a coincidence degree score indicating a degree of coincidence with the first sentence information may be calculated for each of the one or more items in each of the predetermined number of first cases, and a total score obtained by summing up the coincidence degree scores in each of the predetermined number of first cases may be calculated as the degree of coincidence between each of the predetermined number of first cases and the first document.

Further, for example, the document classification method may further include searching for the first sentence information included in the first document by using the second feature words for each of the one or more items in the first case having the highest degree of coincidence and specifying a sentence range indicating a content of each of the one or more items in the first document corresponding to the one or more items in the first case having the highest degree of coincidence based on a distribution of the second feature words for each of the one or more items in the first sentence information, and creating a main point of the content of the item for each of the one or more items in the first document from the first sentence information included in the specified sentence range.

Further, for example, the document classification method may further include storing the first document in the database as a new first case including the created main points and the classified at least one category.

Further, for example, when specifying the sentence range, a range of the first sentence information included in the distribution of the second feature words for each of the one or more items in the first sentence information, in which at least one of a similarity, a density, and a weight of the second feature words for each of the one or more items that is equal to or higher than a predetermined value, may be specified as the sentence range indicating the content of each item, the distribution being obtained by searching for the first sentence information.

Further, a document classifier according to one embodiment of the present disclosure is a document classifier that classifies a document into at least one category, the document classifier including: a processor, and a memory, in which the processor is configured to use a program recorded in the memory to extract one or more first feature words from first sentence information included in a first document to be classified, to extract a predetermined number of first cases similar to the first document based on the extracted one or more first feature words from a database that includes a plurality of cases in which second sentence information indicating a main point of an item classified in advance by meaning is previously included for each of one or more items and one or more categories classified in advance are assigned, to extract one or more second feature words of each of the predetermined number of first cases from the second sentence information of each of the predetermined number of first cases, to calculate a degree of coincidence between each of the predetermined number of first cases and the first document based on the extracted one or more second feature words, and to classify the first document into at least one category by determining one or more categories assigned to the first case having the highest degree of coincidence among the calculated degrees of coincidence as the category of the first document.

Further, a recording medium according to one embodiment of the present disclosure is a computer-readable non-temporary recording medium having recorded therein a program for causing a computer to execute a document classification method of classifying a document into at least one category, the computer executes: extracting one or more first feature words from first sentence information included in a first document to be classified, extracting a predetermined number of first cases similar to the first document based on the extracted one or more first feature words from a database that includes a plurality of cases in which second sentence information indicating a main point of an item classified in advance by meaning is previously included for each of one or more items and one or more categories classified in advance are assigned, extracting one or more second feature words of each of the predetermined number of first cases from the second sentence information of each of the predetermined number of first cases, calculating a degree of coincidence between each of the predetermined number of first cases and the first document based on the extracted one or more second feature words, and classifying the first document into at least one category by determining one or more categories assigned to the first case having the highest degree of coincidence among the calculated degrees of coincidence as the category of the first document.

Each of the embodiments described below is a specific example of the present disclosure. The numerical values, shapes, components, steps, order of steps, and the like illustrated in the following embodiments are examples, and are not intended to limit the present disclosure. Further, among the components in the following embodiments, components not described in the independent claims indicating the highest concept are described as arbitrary components. Moreover, in all the embodiments, each content can be combined.

Embodiment 1

Hereinafter, a document classifier and the like according to Embodiment 1 will be described with reference to drawings.

[Configuration]

FIG. 1 is a block diagram illustrating an example of document classifier 10 according to Embodiment 1.

As illustrated in FIG. 1, document classifier 10 according to Embodiment 1 classifies a document to be classified into at least one category by using database 11 in which the cases already classified with high accuracy are accumulated.

Document classifier 10 according to Embodiment 1 outputs the classified categories as the classification result for the document to be classified.

Here, database 11 according to Embodiment 1 will be described.

[Database 11]

Database 11 includes a plurality of cases in which second sentence information indicating a main point of an item classified in advance by meaning is previously included for each of one or more items, and one or more categories classified in advance are assigned.

More specifically, in database 11, documents including academic literature such as technical reports or papers are classified into categories after an expert understands the meaning of the sentences included in the documents, and a plurality of cases including the sentences of the organized documents are stored. In database 11, cases organized by the expert in this way have been accumulated (stored) in large quantities from the past. In other words, the cases to be stored in database 11 are classified into categories after the expert understands the meaning of the sentences included in the document. Further, the case to be stored in database 11 contains sentences (corresponding to the sentences indicated by second document information) indicating the main points of the organized content of the sentences for each item classified (or tagged) by meaning after each category expert understands the meaning of the sentences included in the document.

Here, the items are named, for example, "phenomenon", "mechanism", "cause", and "treatment or countermeasure" when the document to be organized into a case is a technical report on defect analysis. The names of the items are not limited to these examples, but may be classified by the meaning of the sentences included in the document to be organized into cases, and may be names that can be understood by the expert to summarize the content of the sentences.

FIG. 2 is a diagram illustrating an example of a plurality of cases included in database 11 according to Embodiment 1.

In the present embodiment, database 11 stores a plurality of cases for each category as in the example illustrated in FIG. 2. In FIG. 2, an item classification case means a case in which the sentences of an original document are classified for each item and contains sentences indicating the main point for each item. FIG. 2 illustrates an example of a case where items 1 to 5 indicated by "target", "failure mode", "impact", "cause", and "countermeasure" contain the second document information (not illustrated) indicating the main points created by classifying the sentences of the original document. More specifically, FIG. 2 illustrates an example where category A includes item classification case a to item classification case x, category B includes item classification case a to item classification case x, . . . , category K includes only item classification case a. In FIG. 2, a URL is also attached so that the document that is the source of a case can be referred to.

Subsequently, the functional configuration of document classifier 10 illustrated in FIG. 1 will be described.

[Document Classifier 10]

Figure 3:
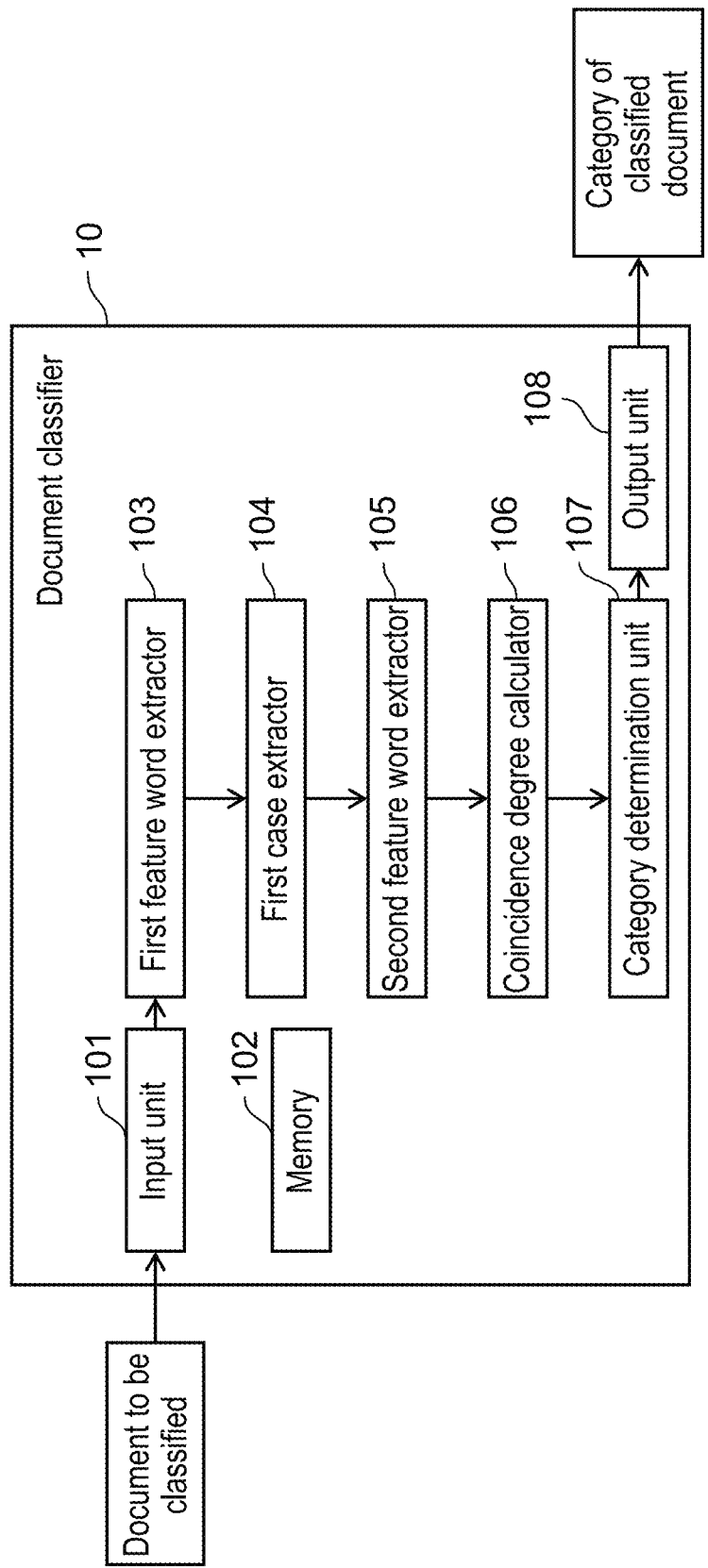
FIG. 3 is a block diagram illustrating a functional configuration example of the document classifier according to Embodiment 1.

FIG. 3 is a block diagram illustrating a functional configuration example of document classifier 10 according to Embodiment 1.

Document classifier 10 is realized by a computer including a processor (microprocessor) such as a CPU, a memory, and the like. In the present embodiment, as illustrated in FIG. 3, for example, document classifier 10 includes input unit 101, memory 102, first feature word extractor 103, first case extractor 104, second feature word extractor 105, coincidence degree calculator 106, category determination unit 107, and output unit 108. It is not essential that document classifier 10 includes input unit 101 and output unit 108.

<Input Unit 101>

A document to be classified into a category, that is, a document to be classified is input to input unit 101. In the present embodiment, a first document to be classified is input to input unit 101. Here, the first document input to input unit 101 is not limited to the academic literature such as the above-mentioned technical report or paper, but may be a novel or the like. That is, the first document input to input unit 101 may be classified into a category from the sentences included therein, and the sentences may be divided into a plurality of items classified by meaning.

<Memory 102>

Memory 102 is an example of a storage medium, and is configured with, for example, a rewritable non-volatile memory such as a hard disk drive or a solid state drive. In the present embodiment, memory 102 stores the first document input to input unit 101.

Further, memory 102 stores a plurality of first cases extracted from database 11.

<First Feature Word Extractor 103>

First feature word extractor 103 extracts one or more first feature words from first sentence information included in a first document to be classified by performing natural language processing with a small processing load. Here, the first feature word is a phrase or word that constitutes the first sentence illustrated in the first sentence information included in the first document and is a feature of the first document.

More specifically, first, first feature word extractor 103 extracts a plurality of words included in the first sentence information by morphological analysis of the first sentence information included in the first document input to input unit 101. Next, first feature word extractor 103 calculates a score from the frequency of occurrence and co-occurrence relationship of the plurality of words obtained by performing the dependency analysis of the plurality of words. First feature word extractor 103 extracts one or more first feature words from the first sentence information by determining one or more words whose calculated score is equal to or higher than a threshold value as one or more first feature words.

In this way, first feature word extractor 103 extracts a plurality of first feature words having a large score calculated by performing the dependency analysis from the frequency of occurrence and the co-occurrence relationship of the plurality of words constituting the first sentence information included in the first document input to input unit 101. First feature word extractor 103 extracts the first feature words without repeating the natural language processing. That is, first feature word extractor 103 extracts the first feature words from the score calculated by performing natural language processing with a small processing load.

Figure 4:
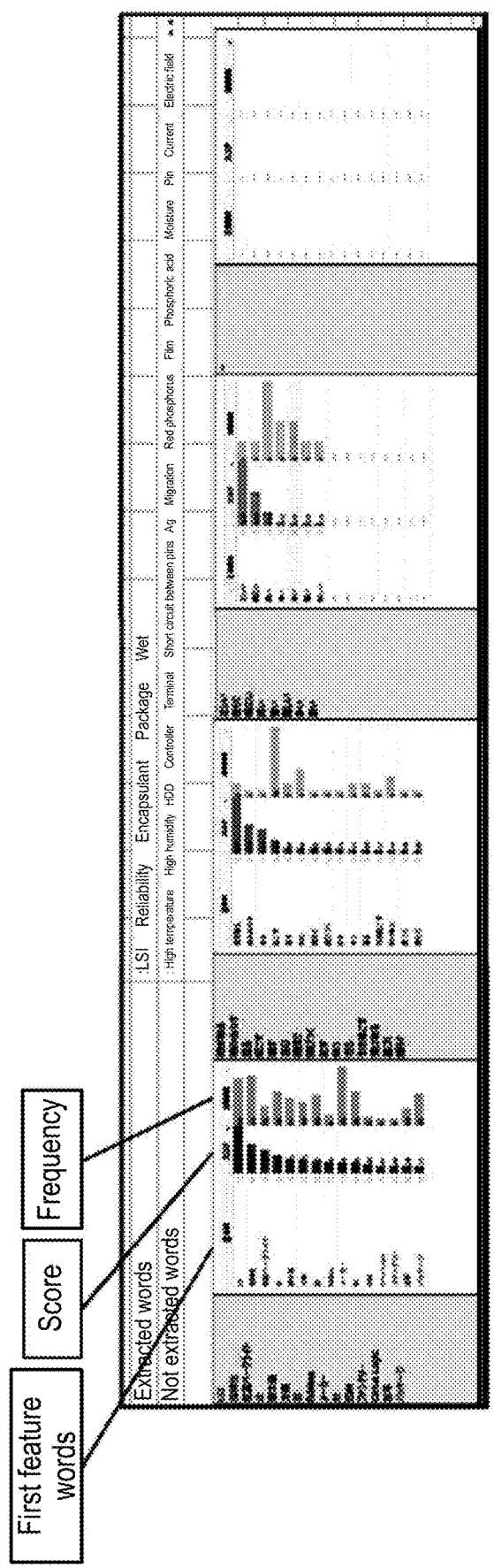
FIG. 4 is a diagram illustrating an example of a method of extracting first feature words by a first feature word extractor according to Embodiment 1.

FIG. 4 is a diagram illustrating an example of a method of extracting the first feature words by first feature word extractor 103 according to Embodiment 1.

In the present embodiment, first feature word extractor 103 extracts a plurality of words from the first sentence information included in the first document and calculates the frequency and score of each of the extracted plurality of words as in the example illustrated in FIG. 4. First feature word extractor 103 extracts the words whose score is equal to or higher than the threshold value among the words illustrated in the leftmost column illustrated in FIG. 4 as the above-mentioned one or more first feature words. In the example illustrated in FIG. 4, first feature word extractor 103 extracts one or more first feature words of "LSI", "reliability", "encapsulant", "package", and "wet". As a result, it can be seen that first feature word extractor 103 extracts the first feature words by using the calculated score without repeating the natural language processing.

<First Case Extractor 104>

First case extractor 104 extracts a predetermined number of first cases similar to the first document from database 11 based on one or more first feature words extracted by first feature word extractor 103.

More specifically, first, first case extractor 104 compares the second sentence information of each of a plurality of cases included in database 11 with one or more first feature words extracted by first feature word extractor 103 and calculates the degree of similarity between the word included in the second sentence information and one or more first feature words. First case extractor 104 includes the first cases having the highest degree of similarity calculated and extracts a predetermined number of first cases from the first cases having the highest degree in descending order of the degree of similarity. The degree of similarity between the word included in the second sentence information and one or more first feature words may be calculated as a score.

In this way, first case extractor 104 extracts a predetermined number of first cases similar to the first document from database 11 by using one or more first feature words included in the first document.

FIG. 5 is a diagram illustrating an example of the first cases extracted by first case extractor 104 according to Embodiment 1. The same elements as those in FIG. 2 are given the same names and the like, and the detailed description thereof will be omitted.

FIG. 5 illustrates an example in which five first cases classified into category A, category D, and category E are extracted from database 11. More specifically, an example is illustrated, in which in category A, the first case of NO.502 and NO.503, in category D, the first case of NO.10521 and NO.10525, and in category E, the first case of NO.15231 is extracted from database 11.

<Second Feature Word Extractor 105>

Second feature word extractor 105 extracts one or more second feature words of each of the predetermined number of first cases from the second sentence information of each of the predetermined number of first cases extracted by first case extractor 104.

More specifically, second feature word extractor 105 extracts the second feature words for each of one or more items in each of the predetermined number of first cases as one or more second feature words from the second sentence information included for each of one or more items of each of the predetermined number of first cases.

In this way, second feature word extractor 105 extracts the second feature words, which are the feature word, for each item included in each of the predetermined number of first cases extracted by first case extractor 104.

<Coincidence Degree Calculator 106>

Coincidence degree calculator 106 calculates the degree of coincidence between each of the predetermined number of first cases and the first document based on one or more second feature words extracted by second feature word extractor 105.

More specifically, first, coincidence degree calculator 106 compares the second feature words for each of one or more items in each of the predetermined number of first cases with the first sentence information included in the first document.

Next, coincidence degree calculator 106 calculates a coincidence degree score indicating the degree of coincidence with the first sentence information for each of one or more items in each of a predetermined number of first cases. Coincidence degree calculator 106 calculates the total score obtained by summing up the coincidence degree scores in each of the predetermined number of first cases as the degree of coincidence between each of the predetermined number of first cases and the first document.

In this way, coincidence degree calculator 106 calculates the degree of coincidence between each of the predetermined number of first cases and the first document by comparing the second feature words extracted for each item in each of the predetermined number of first cases with the first document.

FIG. 6 is a diagram illustrating examples of degrees of coincidence between the items of each of the five first cases extracted in FIG. 5 and the first document. The same elements as those in FIG. 5 are given the same names and the like, and the detailed description thereof will be omitted.

FIG. 6 illustrates an example of the result of calculating the degree of coincidence with the first document by extracting the second feature words for each item of the first case of NO.502 and NO.503 in category A, NO.10521 and NO.10525 in category D, and NO.15231 in category E. Further, in FIG. 6, the item having the highest degree of coincidence with the first document is represented by A, and A→B→C→D are set in descending order of the degree of coincidence. A indicates a case where the score indicating the degree of coincidence is 70 or more, B indicates a case where the score indicating the degree of coincidence is less than 70 and is 60 or more, and C indicates a case where the score indicating the degree of coincidence is less than 50 and 30 or more. Although not represented in FIG. 6, D indicates a case where the score indicating the degree of coincidence is less than 30.

From FIG. 6, it can be seen that the first case having the highest degree of coincidence with the first document is the first case of NO.503 among the five first cases extracted in FIG. 5.

<Category Determination Unit 107>

Among the degrees of coincidence calculated by coincidence degree calculator 106, category determination unit 107 classifies the first document into at least one category by determining one or more categories assigned to the first case having the highest degree of coincidence into the category of the first document.

In the example illustrated in FIG. 6, since the first case having the highest degree of coincidence with the first document is NO.503, category determination unit 107 classifies the category of the first document as category A.

In this way, category determination unit 107 selects the first case with many items having the highest degree of coincidence and determines the category of the selected first case as the category of the first document.

<Output Unit 108>

Output unit 108 outputs the category of the first document determined by category determination unit 107 as a classification result, that is, a category of the classified first document.

[Hardware Configuration of Document Classifier 10]

Figure 7:
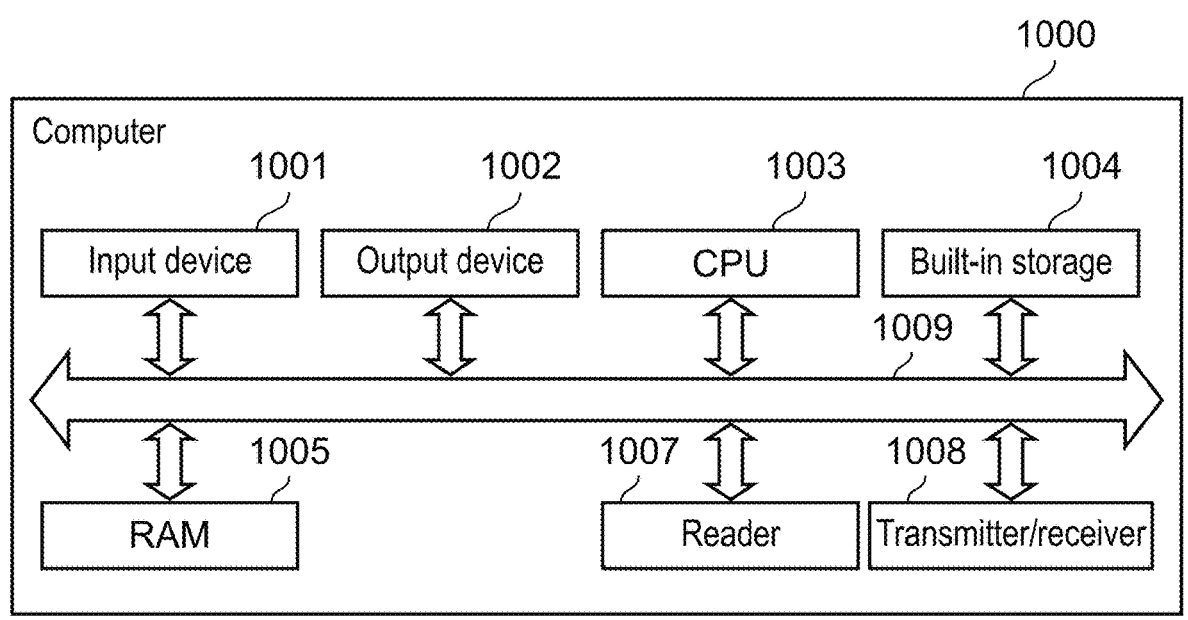
FIG. 7 is a diagram illustrating an example of a hardware configuration of a computer that realizes the functions of the document classifier according to Embodiment 1 by software.

Next, the hardware configuration of document classifier 10 according to the present embodiment will be described with reference to FIG. 7. FIG. 7 is a diagram illustrating an example of a hardware configuration of computer 1000 that realizes the function of document classifier 10 according to the present embodiment by software.

As illustrated in FIG. 7, computer 1000 is a computer including input device 1001, output device 1002, CPU 1003, built-in storage 1004, RAM 1005, reader 1007, transmitter/receiver 1008, and bus 1009. Input device 1001, output device 1002, CPU 1003, built-in storage 1004, RAM 1005, reader 1007, and transmitter/receiver 1008 are connected by bus 1009.

Input device 1001 is a device that serves as a user interface such as an input button, a touch pad, and a touch panel display and accepts user operations. Input device 1001 may be configured to accept a user's contact operation, a voice operation, a remote control, or the like.

Built-in storage 1004 is a flash memory or the like. Further, in built-in storage 1004, at least one of a program for realizing the function of document classifier 10 and an application using the functional configuration of document classifier 10 may be stored in advance.

RAM 1005 is a random access memory, which is used to store data or the like when executing a program or application.

Reader 1007 reads information from a recording medium such as a universal serial bus (USB) memory. Reader 1007 reads the program or application from the recording medium on which the above program or application is recorded and stores the program or application in built-in storage 1004.

Transmitter/receiver 1008 is a communication circuit for wireless or wired communication. Transmitter/receiver 1008 communicates with, for example, a server device connected to a network, downloads a program or application as described above from the server device, and stores the program or application in built-in storage 1004.

CPU 1003 is a central processing unit that copies the program and application stored in built-in storage 1004 to RAM 1005, and sequentially reads and executes instructions included in the program and application from RAM 1005.

[Operation]

Subsequently, an example of the operation of document classifier 10 configured as described above will be described below.

Figure 8:
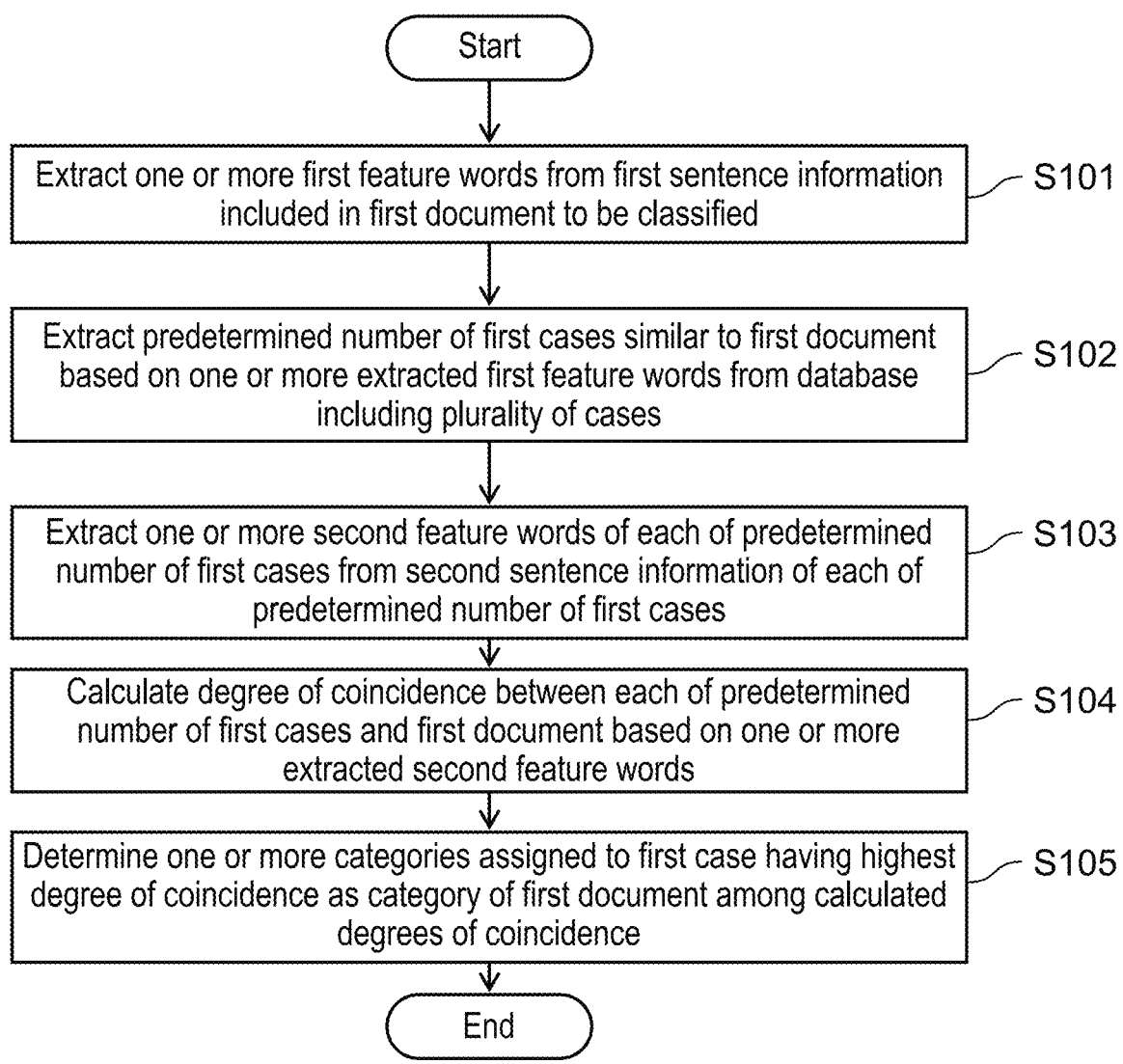
FIG. 8 is a flowchart illustrating an operation example of the document classifier according to Embodiment 1.

FIG. 8 is a flowchart illustrating an example of the operation of document classifier 10 according to Embodiment 1.

Document classifier 10 includes a processor and a memory and performs the following processing of steps S101 to S105 by using the processor and the program recorded in the memory. More specifically, first, document classifier 10 extracts one or more first feature words from the first sentence information included in the first document to be classified (S101). Next, document classifier 10 extracts a predetermined number of first cases similar to the first document from database 11 including a plurality of cases based on one or more first feature words extracted in step S101 (S102). Next, document classifier 10 extracts one or more second feature words of each of the predetermined number of first cases from the second sentence information of each of the predetermined number of first cases extracted in step S102 (S103). Next, document classifier 10 calculates the degree of coincidence between each of the predetermined number of first cases and the first document based on one or more second feature words extracted in step S103 (S104). Next, document classifier 10 determines one or more categories assigned to the first case having the highest degree of coincidence among the degrees of coincidence calculated in step S104 as the category of the first document (S105).

Document classifier 10 outputs the category of the first document determined in step S104 as a classification result, that is, the category of the classified first document.

[Effects and the Like]

As described above, even if one or more first feature words are not accurately extracted from the first sentence information included in the first document to be classified, document classifier 10 can accurately classify the category of the document by using database 11 in which the cases already classified with high accuracy are accumulated.

More specifically, document classifier 10 extracts a plurality of first feature words from the first sentence information included in the first document to be classified and extracts a predetermined number of first cases similar to the first document from database 11 by using one or more first feature words having a higher score calculated when one or more first feature words were extracted. As a result, as compared with the technique disclosed in Japanese Patent Unexamined Publication No. 2014-41481, document classifier 10 extracts one or more first feature words from the first sentence information included in the first document to be classified without repeating natural language processing. That is, document classifier 10 can extract one or more first feature words while reducing the amount of calculation by the computer.

Further, document classifier 10 calculates the degree of coincidence with the first document to be classified by using one or more second feature words extracted from each of the extracted predetermined number of first cases and determines the category of the first case most similar to the first document as the category of the first document. That is, by using database 11 in which the cases already classified with high accuracy are accumulated, document classifier 10 classifies the category of the first document by setting the category of the first case, which is most similar to the first document, as the category of the first document. As a result, document classifier 10 can accurately classify the category of the first document without accurately extracting the first feature word.

Therefore, since document classifier 10 does not require complicated processing such as repetition of natural language processing, it is possible to accurately classify the category of the document while reducing the amount of computer calculation.

In the present embodiment, when there is no first case similar to the first document, document classifier 10 may classify a new category into the first document even if database 11 is used. Further, when there are a plurality of first cases that are most similar to the first document, document classifier 10 may classify all the categories of each of the plurality of first cases into the categories of the first document by using database 11.

As described above, according to the present embodiment, document classifier 10 can accurately classify the categories of a document.

Embodiment 2

In Embodiment 1, document classifier 10 that classifies the document to be classified into at least one category by using database 11 has been described, but the present disclosure is not limited thereto. By using database 11, the document classifier may classify the category of the document to be classified, classify the sentences included in the document by item according to the content, and create main points that are organized and summarized sentences. Document classifier 20 and the like in this case will be described as Embodiment 2. In the following, the differences from Embodiment 1 will be mainly described.

[Document Classifier 20]

Figure 9:
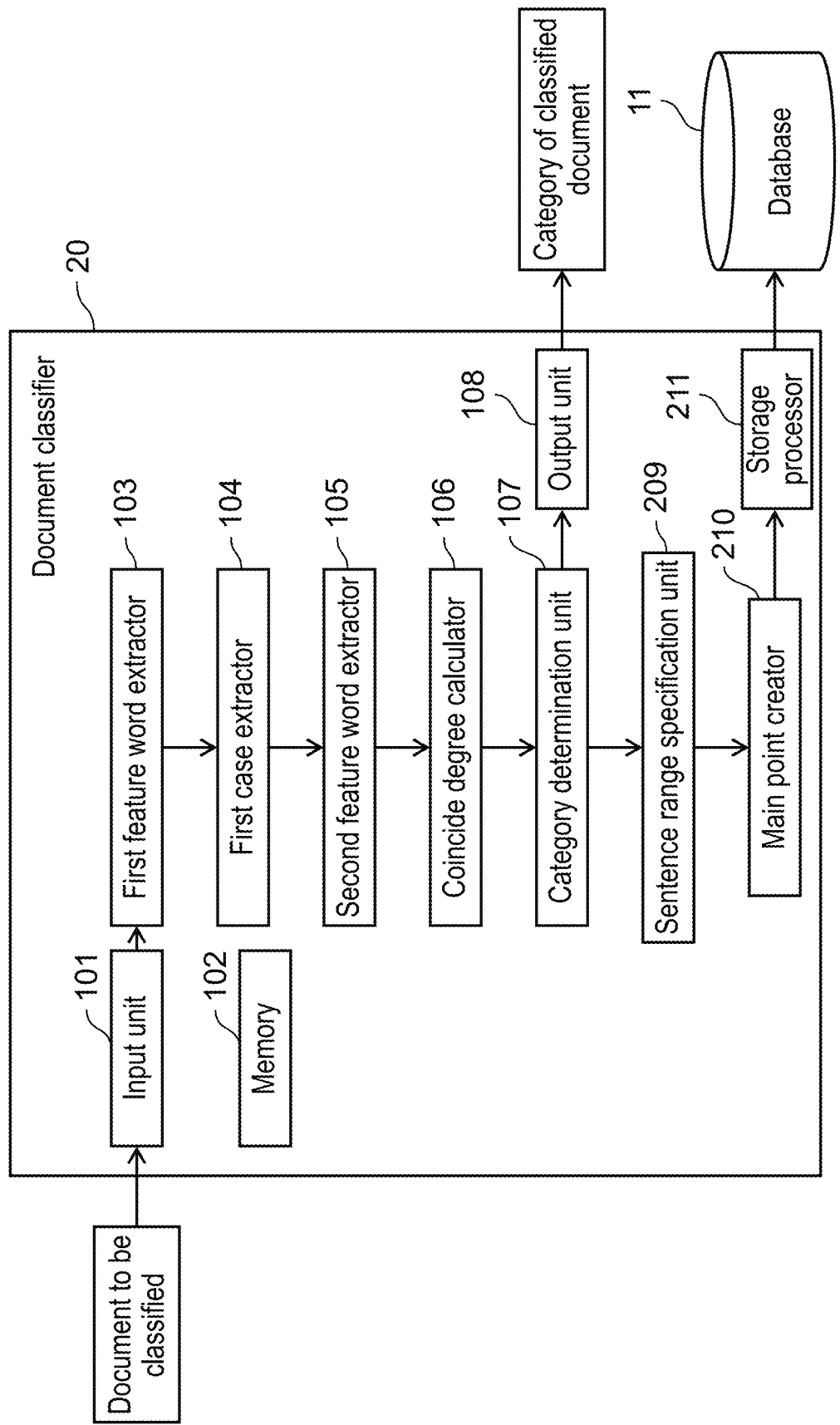
FIG. 9 is a block diagram illustrating a functional configuration example of a document classifier according to Embodiment 2.

FIG. 9 is a block diagram illustrating a functional configuration example of document classifier 20 according to Embodiment 2. Document classifier 20 illustrated in FIG. 9 is different from document classifier 10 according to Embodiment 1 in that a configuration of sentence range specification unit 209, main point creator 210, and storage processor 211 has been added.

<Sentence Range Specification Unit 209>

Sentence range specification unit 209 searches for the first sentence information included in the first document by using the second feature words for each of one or more items in the first case with the highest degree of coincidence among the degrees of coincidence calculated by coincidence degree calculator 106. Sentence range specification unit 209 specifies a sentence range indicating the content of each of one or more items in the first document, which corresponds to one or more items in the first case having the highest degree of coincidence based on the distribution of the second feature words for each of one or more items in the first sentence information obtained by searching. More specifically, by searching for the first sentence information, sentence range specification unit 209 obtains a distribution of the second feature words for each of the one or more items in the first sentence information and having at least one of the similarity, density, and weight of the second feature words for each of the one or more items that is equal to or higher than a predetermined value. Sentence range specification unit 209 specifies a range of the first sentence information included in the distribution obtained by searching for the first sentence information as a sentence range indicating the content of each item.

In the present embodiment, sentence range specification unit 209 searches for the first sentence information included in the first document by using the second feature words extracted by second feature word extractor 105 for the first case having the highest degree of coincidence. For example, sentence range specification unit 209 may first search for the first sentence information and mark the second feature words in the sentences indicated by the first sentence information. Next, sentence range specification unit 209 creates a distribution indicating the density of the second feature words from the similarity and density (frequency) between the marked second feature words, and the weighting of the second feature words and highlights or display the first sentence information in a heatmap. In the area of the first sentence information that has been highlighted or displayed in a heatmap, sentence range specification unit 209 specifies an area equal to or larger than an appropriate threshold value as a sentence range indicating the content of each item.

Sentence range specification unit 209 is not limited to the case of searching for the first sentence information included in the first document by using the second feature words extracted from the first case having the highest degree of coincidence. Sentence range specification unit 209 may search for the first sentence information by using the second feature words extracted from the first case having the highest degree of coincidence and the related word which is an important keyword related to the second feature words, extracted from a similar word dictionary or the like.

Figure 10:
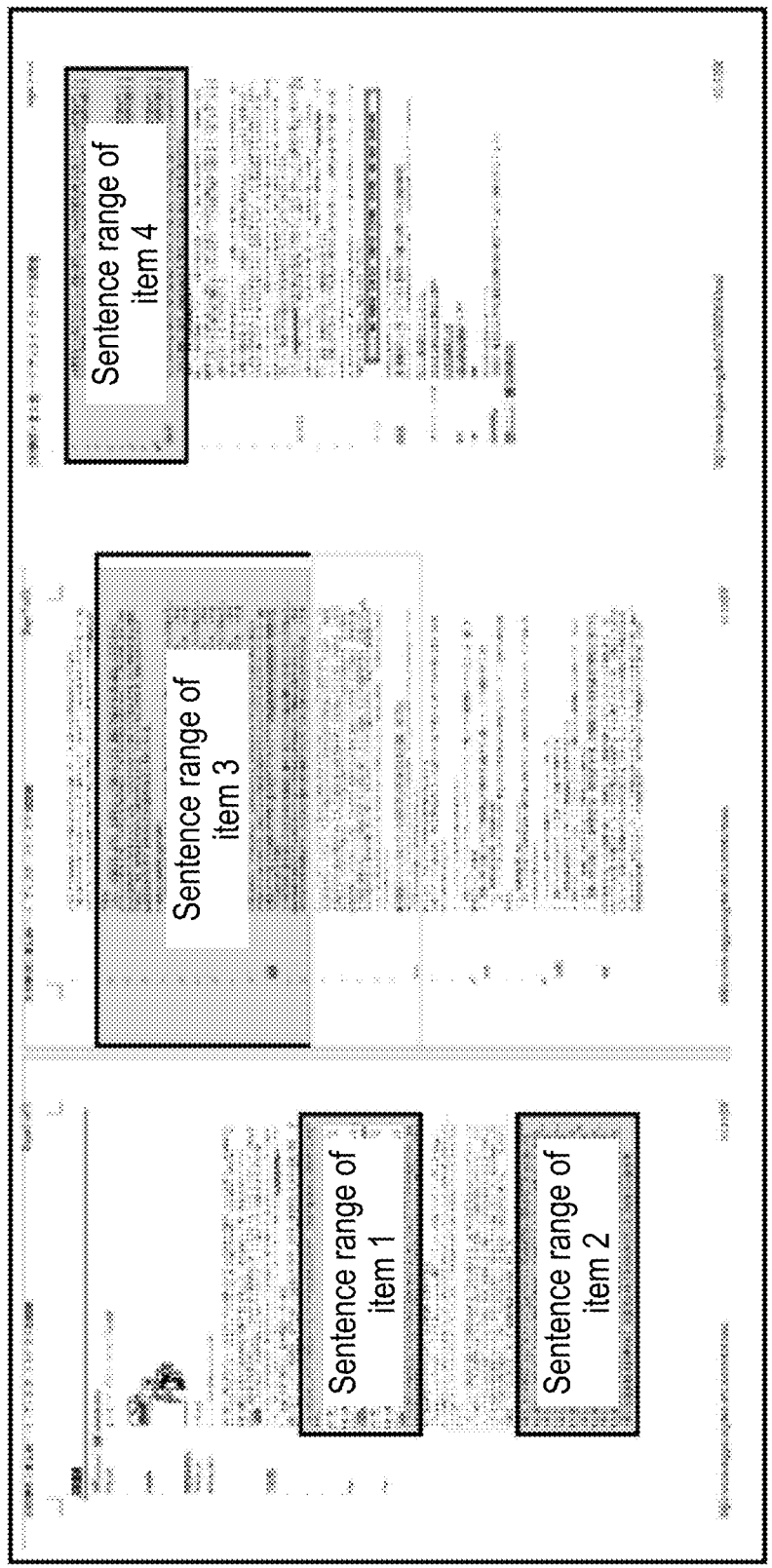
FIG. 10 is a diagram illustrating an example of sentence ranges illustrating the content of each item of the first document specified by a sentence range specification unit according to Embodiment 2.

FIG. 10 is a diagram illustrating an example of sentence ranges illustrating the content of each item of the first document specified by sentence range specification unit 209 according to Embodiment 2. FIG. 10 illustrates an example of a case where for example, the sentence range indicating the content of items 1 to 4 such as "phenomenon", "mechanism", "cause", and "countermeasure" is specified by a hatched frame, in the sentences indicated by the first sentence information included in the first document such as a technical report, for example.

In this way, sentence range specification unit 209 can specify the sentence range indicating the content of each item of the first document by using the second feature words extracted for each item of the first case similar to the first document.

<Main Point Creator 210>

Main point creator 210 creates a main point of the content of the item for each of one or more items in the first document from the first sentence information included in the sentence range specified by sentence range specification unit 209.

Main point creator 210 creates a main point of the content of each item in the first document by performing natural language processing on the sentence range specified by sentence range specification unit 209. Since the natural language processing here is realized by introducing existing software, the detailed description thereof will be omitted.

FIG. 11 is a diagram illustrating an example of the main points of the content of each item in the first document, which are created by main point creator 210 according to Embodiment 2.

In the example illustrated in FIG. 11, when the first document is a technical report on defect analysis, the main points of the content are created from the first sentence information included in the sentence ranges specified by sentence range specification unit 209 for each of a plurality of items such as "phenomenon", "mechanism", "cause", and "countermeasure".

Since it is possible to confirm the main point of each item of the first document at a glance without carefully reading the first document by creating the main points of the content from FIG. 11, it is understood that the meaning of the first sentence information included in the first document can be understood.

<Storage Processor 211>

Storage processor 211 stores the first document in database 11 as a new first case including the main points created by main point creator 210 and at least one classified category.

[Effects and the Like]

As described above, document classifier 20 can classify the category of the first document by using database 11 in which the cases already classified with high accuracy are accumulated and can classify and organize the sentences of the first document by item to create the main point of each item.

That is, first, as compared with the technique disclosed in Japanese Patent Unexamined Publication No. 2014-41481, document classifier 20 also accurately classifies the category of the first document by using database 11 without repeating the natural language processing. Since document classifier 20 classifies the category of the first document by using database 11, it is possible to accurately classify the category of the first document even for the first document including long sentences. Therefore, since document classifier 20 does not require complicated processing such as repetition of natural language processing, it is possible to accurately classify the category of the first document while reducing the amount of computer calculation.

Further, by using database 11, document classifier 20 can create the main point of each item when classified by items that help understand the meaning of the first sentences included in the first document. As a result, it is possible to easily understand the meaning written in the sentences without carefully reading the sentences illustrated in the first sentence information included in the first document.

Further, document classifier 20 stores the first document in database 11 as a case including the main point of the content of each item and the category of the first document. As a result, a document searcher can search database 11 in which the cases including the sentences specified by conceptualizing the scattered meanings in the sentences included in the document are stored, instead of a conventional database that he or she can search for a document in which what he or she wants to know is written. Therefore, by using database 11 in which a document is stored as an example, the searcher is able to know in a short time whether or not what he or she wants to know is written in the document without spending a lot of time reading the document carefully. In other words, since database 11 stores cases in which the main points are organized by item, it is possible to understand the meaning written in a document that is the source of a case and to greatly reduce the search time for similar documents.

Figure 12:
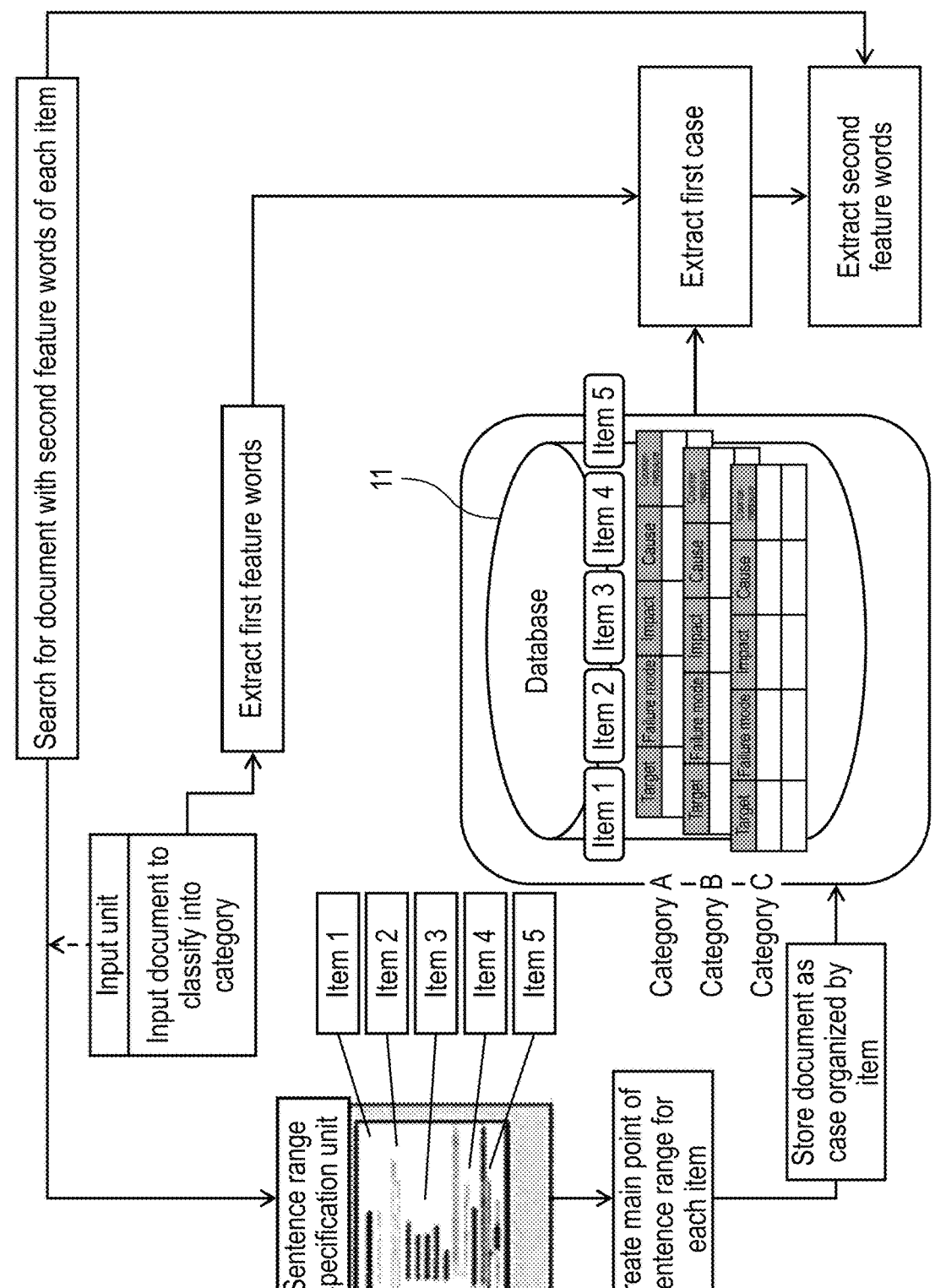
FIG. 12 is a diagram illustrating an outline of processing by the document classifier according to Embodiment 2 until the sentences included in a document are stored in database 11 as cases organized by item.

FIG. 12 is a diagram illustrating an outline of processing by document classifier 20 according to Embodiment 2 until the sentences included in the document are stored in database 11 as cases organized by item.

Since each element illustrated in FIG. 12 has been described above, the detailed description thereof will be omitted, but by performing the processing illustrated in FIG. 12, document classifier 20 according to Embodiment 2 can store in database 11 a case of sentences included in the document that are organized for each item.

Database 11 can also connect the sentences included in the document with a semantic network by accumulating cases of sentences included in the document that are organized by item. Therefore, by using database 11, the computer can also express knowledge, which is another effect.

Possibility of Other Embodiments

Although the document classifier, the document classification method, and the program of the present disclosure have been described in the embodiments, the subject and the device in which each kind of processing is performed are not particularly limited. Each kind of processing may be performed by a processor embedded in a specific device disposed locally (described below). Further, each kind of processing may also be performed by a cloud server or the like disposed at a location different from the local device.

The present disclosure is not limited to the above embodiments. For example, another embodiment realized by arbitrarily combining the components described in the present specification or excluding some of the components may be the embodiment of the present disclosure. The present disclosure also includes modification examples obtained by making various modifications that can be conceived by those skilled in the art within the scope of the gist of the present disclosure, that is, the meaning indicated by the wording described in the claims, with respect to the above-described embodiments.

The present disclosure further includes the following cases.

(1) Specifically, the above-mentioned device is a computer system including a microprocessor, a ROM, a RAM, a hard disk unit, a display unit, a keyboard, a mouse, and the like. A computer program is stored in the RAM or the hard disk unit. When the microprocessor operates according to the computer program, each device achieves the function thereof. Here, the computer program is configured by combining a plurality of instruction codes indicating commands for the computer in order to achieve a predetermined function.

(2) Some or all of the components constituting the above device may include one system of large scale integration (LSI: large-scale integrated circuit). The system LSI is a super-multifunctional LSI manufactured by integrating a plurality of configurators on a single chip, and specifically, is a computer system including a microprocessor, a ROM, a RAM, and the like. A computer program is stored in the RAM. When the microprocessor operates according to the computer program, the system LSI achieves the function thereof.

(3) Some or all of the components constituting the above device may include an IC card or a single module that can be attached to and detached from each device. The IC card or the module is a computer system including a microprocessor, a ROM, a RAM, and the like. The IC card or the module may include the above-mentioned super-multifunctional LSI. When the microprocessor operates according to a computer program, the IC card or the module achieves the function thereof. This IC card or this module may have tamper resistance.

(4) Further, the present disclosure may be the methods illustrated above. The methods may be a computer program realized by a computer, or may be digital signals composed of the computer program.

(5) Further, in the present disclosure, the computer program or the digital signals may be recorded on a computer-readable recording medium such as a flexible disc, a hard disk, a CD-ROM, an MO, a DVD, a DVD-ROM, a DVD-RAM, Blu-ray (registered trademark) disc (BD), a semiconductor memory, or the like. Further, the digital signals may be recorded on these recording media.

Further, in the present disclosure, the computer program or the digital signals may be transmitted via a telecommunication line, a wireless or wired communication line, a network represented by the Internet, data broadcasting, or the like.

Further, in the present disclosure, a computer system may include a microprocessor and a memory, in which the memory stores the computer program, and the microprocessor may operate according to the computer program.

Further, the program or the digital signals may be performed by another independent computer system by transferring the program or the digital signals recorded on the recording medium, or by transferring the program or the digital signals via the network or the like.

The present disclosure can be used for document classification methods, document classifiers, and programs, and in particular for document classification methods, document classifiers, and programs used to classify documents into at least one category.

What is claimed is:

1. A document classification method that is executed by a computer classifying documents into at least one category, the method comprising:
  extracting one or more first feature words from first sentence information included in a first document to be classified;
  extracting, from a database including a plurality of cases, a predetermined number of first cases similar to the first document in accordance with the one or more first feature words extracted from the first sentence information, the plurality of cases including the predetermined number of first cases and being classified in advance into the at least one category, the plurality of cases each including second sentence information indicating a main point of each of one or more items, the one or more items being classified in advance depending on meaning of the item;

extracting one or more second feature words of each of the predetermined number of first cases from the second sentence information of each of the predetermined number of first cases;

calculating a degree of coincidence between each of the predetermined number of first cases and the first document based on the one or more second feature words extracted from the second sentence information of the first case; and classifying the first document into a category among the at least one category, the category being a category into which a first case having a highest degree of coincidence among the predetermined number of the first cases is classified.

2. The document classification method of claim 1, wherein when extracting the one or more first feature words, a plurality of words included in the first sentence information are extracted with morphological analysis of the first sentence information, a score is calculated from a frequency of occurrence and a co-occurrence relationship of the plurality of words obtained by performing a dependency analysis of the plurality of words, and the one or more first feature words are extracted from the first sentence information by determining one or more words having the score equal to or higher than a threshold value as the one or more first feature words.

3. The document classification method of claim 1, wherein when extracting the predetermined number of first cases, a degree of similarity between a word included in the second sentence information and the one or more first feature words is calculated by comparing the second sentence information of each of the plurality of cases included in the database with the one or more first feature words, and the predetermined number of first cases are extracted in descending order of the degree of similarity from the first case having a highest degree of similarity.

4. The document classification method of claim 1, wherein when extracting the one or more second feature words, second feature words for each of the one or more items in each of the predetermined number of first cases are extracted as the one or more second feature words from the second sentence information included for each of the one or more items in each of the predetermined number of first cases.

5. The document classification method of claim 4, wherein when calculating the degree of coincidence, the second feature words for each of the one or more items in each of the predetermined number of first cases are compared with the first sentence information included in the first document, and a coincidence degree score indicating a degree of coincidence with the first sentence information is calculated for each of the one or more items in each of the predetermined number of first cases, and a total score obtained by summing up the coincidence degree scores in each of the predetermined number of first cases is calculated as the degree of coincidence between each of the predetermined number of first cases and the first document.

6. The document classification method of claim 1, further comprising:

searching for the first sentence information included in the first document by using the second feature words for each of the one or more items in the first case having the highest degree of coincidence and specifying a sentence range indicating a content of each of the one or more items in the first document corresponding to the one or more items in the first case having the highest degree of coincidence based on a distribution of the second feature words for each of the one or more items in the first sentence information; and creating a main point of the content of the item for each of the one or more items in the first document from the first sentence information included in the specified sentence range.

7. The document classification method of claim 6, further comprising:

storing the first document in the database as a new first case including the created main points and the classified at least one category.

8. The document classification method of claim 6, wherein when specifying the sentence range, a range of the first sentence information included in the distribution of the second feature words for each of the one or more items in the first sentence information, in which at least one of a similarity, a density, and a weight of the second feature words for each of the one or more items that is equal to or higher than a predetermined value, is specified as the sentence range indicating the content of each item, the distribution being obtained by searching for the first sentence information.

9. A document classifier that classifies documents into at least one category, the document classifier comprising:

a processor; and a memory, wherein the processor is configured:

to use a program recorded in the memory to extract one or more first feature words from first sentence information included in a first document to be classified, to extract, from a database including a plurality of cases, a predetermined number of first cases similar to the first document in accordance with the one or more first feature words extracted from the first sentence information, the plurality of cases including the predetermined number of first cases and being classified in advance into the at least one category, the plurality of cases each including second sentence information indicating a main point of each of one or more items, the one or more items being classified in advance depending on meaning of the item, to extract one or more second feature words of each of the predetermined number of first cases from the second sentence information of each of the predetermined number of first cases, to calculate a degree of coincidence between each of the predetermined number of first cases and the first document based on the one or more second feature words extracted from the second sentence information of the first case, and to classify the first document into a category among the at least one category, the category being a category into which a first case having a highest degree of coincidence among the predetermined number of the first cases is classified.

10. A computer-readable non-temporary recording medium having recorded therein a program for causing a computer to execute a document classification method of classifying documents into at least one category, the computer executes:

extracting one or more first feature words from first sentence information included in a first document to be classified;

extracting, from a database including a plurality of cases, a predetermined number of first cases similar to the first document in accordance with the one or more first feature words extracted from the first sentence information, the plurality of cases including the predetermined number of first cases and being classified in advance into the at least one category, the plurality of cases each including second sentence information indicating a main point of each of one or more items, the one or more items being classified in advance depending on meaning of the item;

extracting one or more second feature words of each of the predetermined number of first cases from the second sentence information of each of the predetermined number of first cases;

calculating a degree of coincidence between each of the predetermined number of first cases and the first document based on the one or more second feature words extracted from the second sentence information of the first case; and classifying the first document into a category among the at least one category, the category being a category into which a first case having a highest degree of coincidence among the predetermined number of the first cases is classified.

* * * * *